United States Patent [19]
Koch et al.

[11] 4,216,641
[45] Aug. 12, 1980

[54] CROP HARVESTING MACHINE

[75] Inventors: Earl E. Koch, Mohnton; Philip J. Ehrhart, Rothsville, both of Pa.

[73] Assignee: Sperry Corporation, New Holland, Pa.

[21] Appl. No.: 48,286

[22] Filed: Jun. 13, 1979

[51] Int. Cl.³ .............................................. A01D 43/10
[52] U.S. Cl. .................................. 56/14.4; 56/DIG. 1
[58] Field of Search ................... 56/14.4, DIG. 1, 14.1

[56] References Cited

U.S. PATENT DOCUMENTS

| | | | |
|---|---|---|---|
| 3,577,716 | 5/1971 | McCarty et al. | 56/259 |
| 3,780,505 | 12/1973 | Pettengill et al. | 56/DIG. 1 |
| 3,797,207 | 3/1974 | Sawyer et al. | 56/DIG. 1 |
| 4,127,981 | 12/1978 | Parrish et al. | 56/DIG. 1 |

OTHER PUBLICATIONS

Sperry New Holland Brochure for Model 1100–1112 Speedrower TM, C–1978.

Primary Examiner—Paul J. Hirsch
Attorney, Agent, or Firm—Larry W. Miller; Frank A. Seemar; Ralph D'Alessandro

[57] ABSTRACT

A twin sickle drive system for a crop harvesting machine is disclosed wherein universal rotary input shafts are connected to each end of the upper conditioning roll to transfer rotational forces therefrom to individual wobble drive units situated along the outside of the machine to either side of the crop conditioning unit. Each wobble drive unit is connected to a drive shaft which transmits reciprocating motion to the sickle bar located adjacent that respective side of the machine.

16 Claims, 7 Drawing Figures

CROP HARVESTING MACHINE

BACKGROUND OF THE INVENTION

The present invention relates generally to crop harvesting machines, commonly referred to as windrowers and, more particularly, to a novel drive system for providing reciprocating motion to a twin sickle bar cutting means.

Generally, windrowers cut a wide swath of crop, consolidate it and pass it through a set of conditioning rolls whose length is less than the length of the cutting means. A single sickle bar element has traditionally been the source of the crop cutting capabilities, an example of which can be found in U.S. Pat. No. 3,324,638 granted to Koch et al, on June 13, 1967. However, with increasingly wider cutting widths, it has been found to be advantageous to utilize a twin sickle cutting means such as revealed in U.S. Pat. No. 3,577,716 granted to McCarty et al. on May 4, 1971. Among the different devices which constitute the various types of crop consolidating means are draper conveyors and augers, such as the consolidating auger found in U.S. Pat. No. 3,324,639 granted to Halls et al. on June 13, 1967.

Presently utilized twin sickle drive systems are normally incorporated in self-propelled crop harvesting machines whereby the source of power is from a centrally located power take-off (p.t.o.) on the base unit. The transfer of power to the opposite sides of the header is accomplished via a common shaft running transverse along the header above the discharge opening and driven by the centrally located power source as in U.S. Pat. No. 3,503,190 or via individual shafts interconnecting the respective drive unit located at the side of the header and the centrally located power source. Examples of this second method are revealed in U.S. Pat. No. 3,283,485 granted to Koch et al. on Nov. 8, 1966, U.S. Pat. No. 3,304,699 granted to Koch et al. on Feb. 21, 1967, U.S. Pat. No. 3,771,297 and the aforementioned U.S. Pat. No. 3,577,716.

A modern design of a pull-type windrower, commonly referred to as a pivot tongue windrower, can be viewed in U.S. Pat. No. 4,081,946 granted to Ehrhart on Apr. 4, 1978. Generally, the primary source of power is provided by a hydrostatic motor connected to a hydraulic system which incorporates the arched draft member as a fluid reservoir. Hydrostatic motors are particularly susceptible to torque peaks caused by variable power requirements within the header drive system. In the design and development of such a crop harvesting machine, it was found that a novel drive system was needed for transmitting reciprocating motion to the dual sickle bar elements. However, to reduce excessive vibrations, the reciprocating motions of the dual sickle bars must be properly timed with respect to each other.

SUMMARY OF THE INVENTION

It is an object of this invention to overcome the aforementioned disadvantages of the prior art by providing a novel drive system to produce and transfer reciprocating motion to twin sickle bar elements.

It is a feature of this invention to provide a simple means to time the reciprocating motion of the individual sickle bars relative to one another in a twin sickle drive system.

It is an advantage of this invention to have a conditioning roll provide a flywheel effect to assist in smoothing sickle drives and reducing torque peaks within a hydrostatic motor drive system.

It is another object of this invention to provide a twin sickle drive system which is more compatible to hydrostatic drive motors.

It is a still another object of this invention to provide for a design of a twin sickle drive system which can be manufactured and utilized simply and inexpensively.

It is another advantage of this invention to eliminate the need for a separate drive shaft, supports and bearings to span the length of the conditioning roll in a twin sickle drive system.

It is another feature of this invention to provide a twin sickle drive system which will pass through the area occupied by the crop conditioning unit without interfering with the material flow therethrough.

It is a further object of this invention to provide a twin sickle drive system which is durable in construction, inexpensive of manufacture, carefree of maintenance, facile in assemblage and effective in use.

These and other objects, features and advantages are accomplished according to the instant invention by providing a twin sickle drive system for a crop harvesting machine wherein universal rotary input shafts are connected to each end of the upper conditioning roll to transfer rotational forces to individual wobble drive units situated along the outside of the machine to either side of the crop conditioning unit. Each wobble drive unit is connected to a drive shaft which transmits reciprocating motion to the sickle bar located adjacent that respective side of the machine.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE INVENTION

Figure 1:
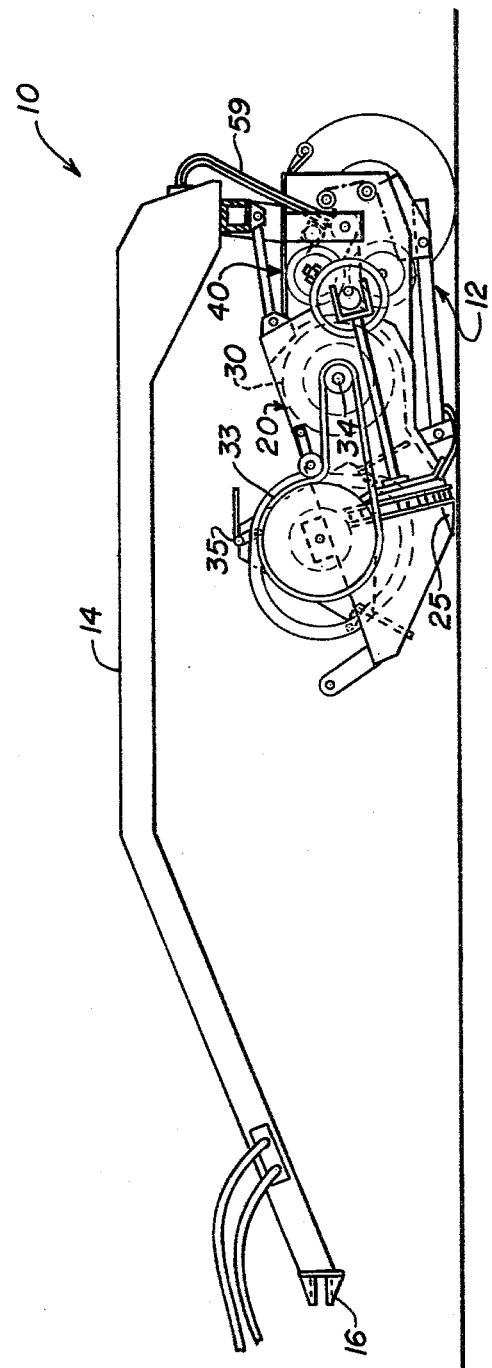
FIG. 1 is a left side elevational view of the preferred embodiment of a crop harvesting machine incorporating the principles of the present invention.

Referring now to the drawings and particularly to FIG. 1, a left side elevational view of the crop harvesting machine commonly referred to as a pivot tongue windrower can be seen. Left and right references are used as a matter of convenience and are determined by standing at the rear of the machine facing the forward end, the direction of travel. This windrower 10 is generally comprised of a mobile frame 12, a draft member 14 pivotally attached at its rear end to the frame 12, including a clevis 16 at its forward end for pivotal attachment to a tractor or other towing vehicle (not shown), a crop harvesting header 20 movably suspended from the forward end of the frame 12, and a crop treating means 40 rotatably secured within said frame.

Figure 2:
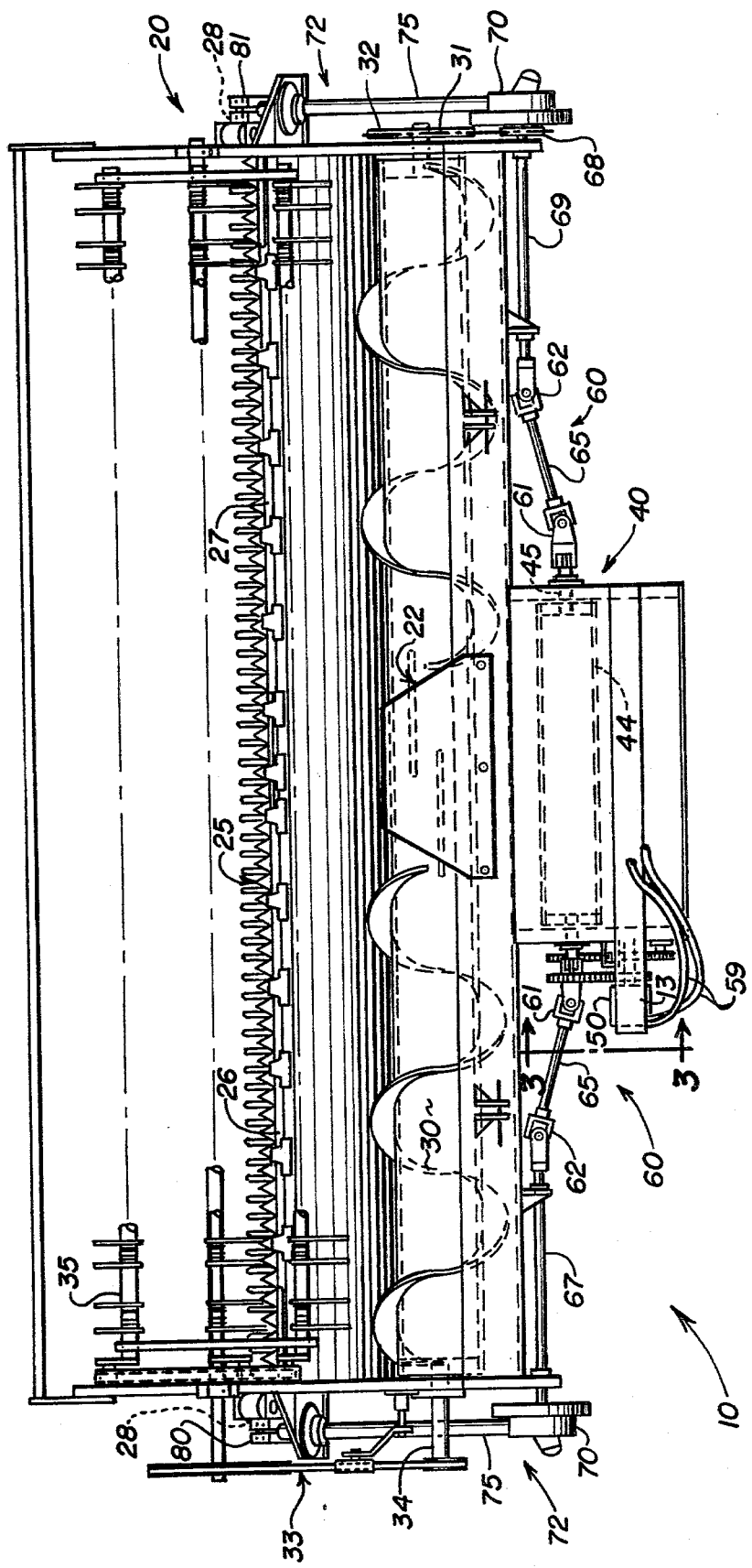
FIG. 2 is a top plan view of the machine shown in FIG. 1 highlighting the twin sickle drive system incorporating the principles of the present invention, the draft member being removed for clarity.

Referring to both FIG. 1 and FIG. 2, component parts of the header 20 are shown as including a reciprocating sickle bar cutting means 25, a reel 35 for sweeping the crop rearwardly over the cutting means 25, and an auger 30 to consolidate the crop being delivered rearwardly by the reel 35 and to project it rearwardly for engagement with the crop treating means 40. The sickle bar cutting means 25 includes a left sickle bar 26 and a right sickle bar 27. An example of this sickle bar arrangement can be found in the previously noted U.S. Pat. No. 3,577,716. This type of windrower structure is generally described along with a specific disclosure of a header suspension and lift means in U.S. Pat. No. 4,081,946 granted to Philip J. Ehrhart on Apr. 4, 1978. It should be realized by one skilled in the art that the twin sickle drive system disclosed herein is not limited solely to inclusion on a pivot tongue windrower.

Figure 3:
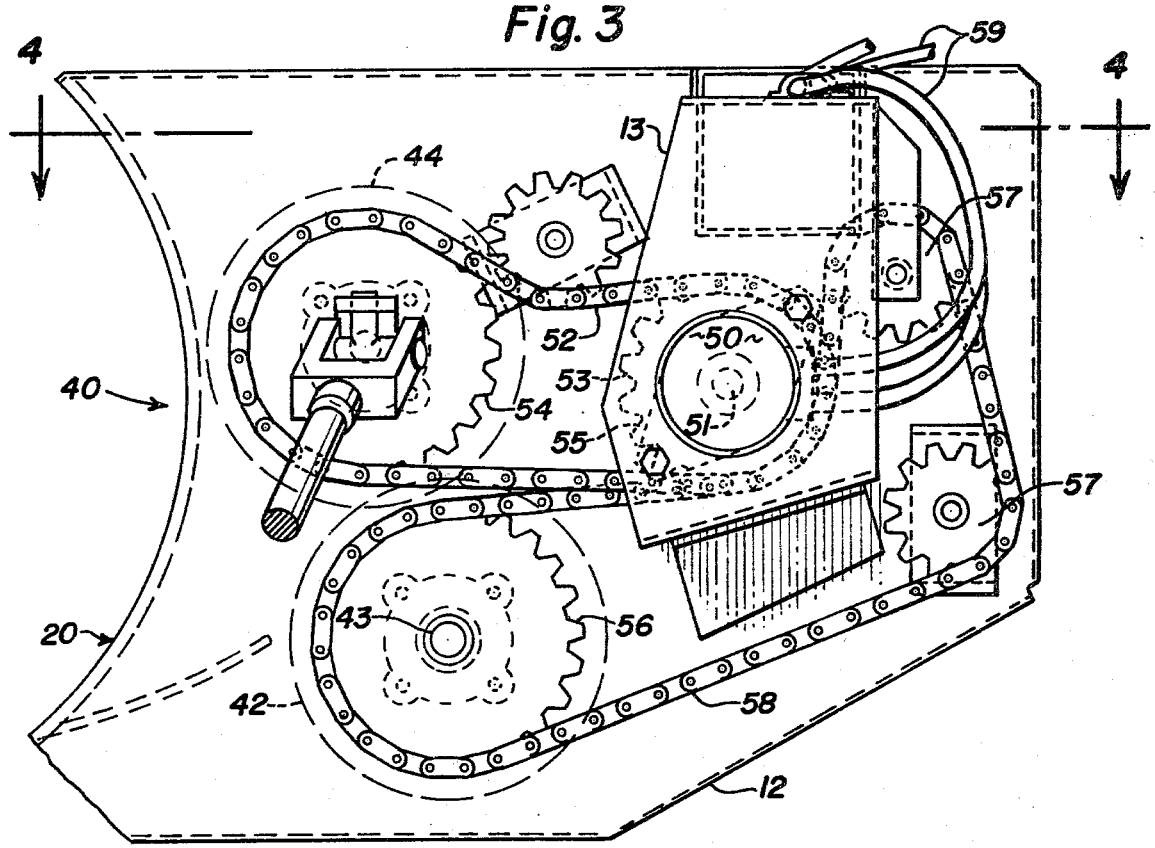
FIG. 3 is an enlarged cross sectional view taken along line 3—3 of FIG. 2 showing the hydrostatic motor as the primary drive source utilizing a chain drive system.
Figure 4:
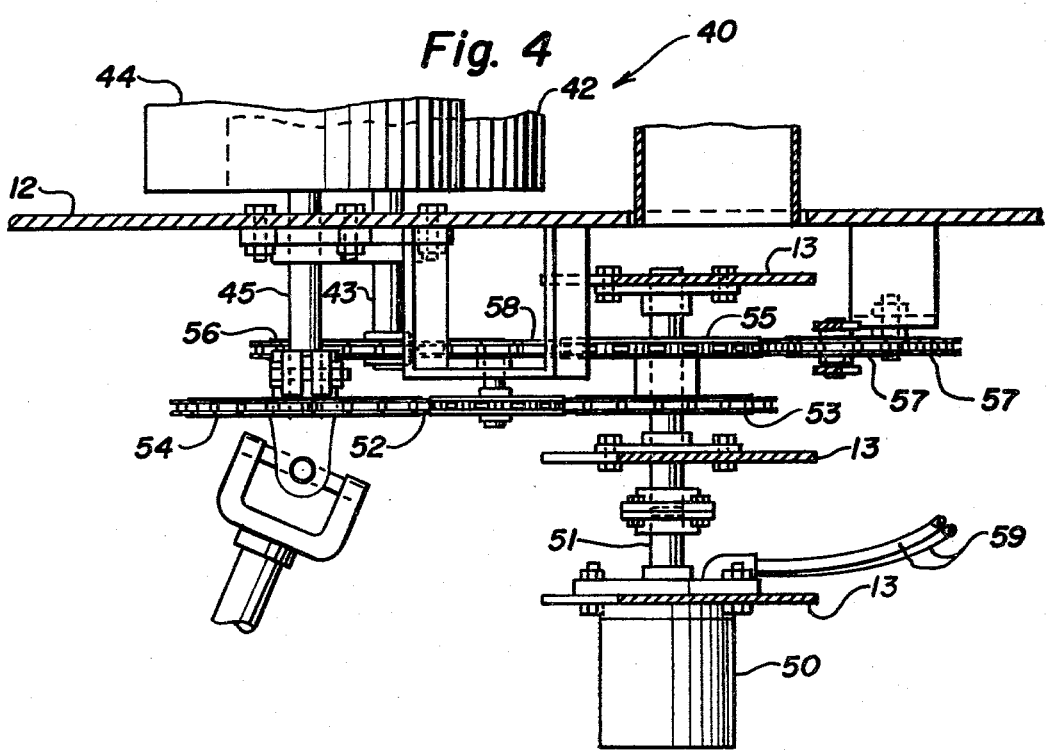
FIG. 4 is the top plan view corresponding to line 4—4 of the view seen in FIG. 3.

As best seen in FIGS. 3 and 4, the crop treating means 40 includes a lower conditioning roll 42 rotatably secured by the frame 12 rearward of the discharge opening 22 of the header 20. An upper conditioning roll 44 is located above and forward of the lower conditioning roll 42. The upper roll 44 is also rotatably secured but is biased to permit generally vertical movement, thereby allowing variable amounts of material to pass between the conditioning rolls 42, 44 without clogging the machine. An example of this biasing arrangement can be found in U.S. Pat. No. 3,309,850 granted to Glass et al. on Mar. 21, 1967.

The primary source of power for the windrower 10 is a hydrostatic motor 50. As best seen in FIGS. 2, 3 and 4 this motor 50 is mounted on the frame bracket 13 adjacent the crop treating means 40. A chain 52 transfers rotational motion from the sprocket 53 on the motor shaft 51 to sprocket 54 on the upper roll shaft 45, thereby providing a drive to rotate the upper roll 44. The lower roll 42 is driven by means of a chain 58 interconnecting sprocket 55 on motor shaft 51, sprocket 56 on lower roll shaft 43 and two idler sprockets 57. As can be best seen in FIG. 3, chain 52 and chain 58 are so situated with respect to sprocket 53 and sprocket 55 on the motor shaft 51 that the lower roll 42 and the upper roll 44 rotate in opposite directions discharging material rearwardly. The hydrostatic motor 50 is connected to the hydraulic system built into the windrower by means of two hydraulic hoses 59. Hydraulic fluids circulating through the motor 50 by means of the hydraulic hoses 59 is the source of power for the hydrostatic motor.

Referring now to FIG. 2, universal rotary input shaft assemblies 60 are attached to each respective end of the upper roll 44. Each universal shaft assembly includes a first universal joint 61, a second universal joint 62 and a first shaft member 65 interconnecting the respective first and second universal joints. The first universal joint 61 is affixed to shaft 45 of the upper conditioning roll 44. The second universal joint 62 is attached to a second shaft member 67 or 69 which drives the wobble hub 70. Drive shafts 75 interconnect the wobble hub 70 and the rocker assemblies 80 or 81. The left rocker assembly 80 is connected to the outboard end 28 of the left sickle bar 26. Likewise, the right rocker assembly 81 is connected to the outboard end 28 of the right sickle bar 27. A wobble drive unit 72 can be defined as a mechanism which transforms rotational movement, such as that supplied by universal rotary input shaft assemblies 60, into a reciprocating linear motion to the cutting means 25, an example being the particular arrangement described above including a wobble hub 70, the drive shaft 75 and rocker assembly 80 or 81, which is described in more detail in U.S. Pat. No. 3,324,638 granted to Koch et al. on June 13, 1967. It should also be realized by one skilled in the art that this definition of a wobble drive unit is not limited to this particular arrangement and would encompass devices commonly referred to as pitman drives, sway bars, mule drives and the like.

In the preferred embodiment as depicted in FIG. 1 and FIG. 2, the auger 30 is driven by a chain 31 interconnecting the sprocket 68 affixed to the right side second shaft member 69 and the sprocket 32 attached to the auger shaft 34. The rotating auger 30 in turn rotates the reel 35 by a belt and pulley arrangement 33 on the left side of the windrower 10. It should be further realized by one skilled in the art that the method of driving the auger 30 and the reel 35 is merely one of many possible variations and, therefore, is not a limitation to the instant invention.

The utilization of a twin sickle drive system embodying the principles of the present invention provides several advantages heretofore unrealized. Making a conditioner roll directly a part of the drive system provides a "flywheel effect" to assist in overcoming peak torque requirements. Overcoming torque peaks has been found to be a particular problem with hydrostatic motors. Also, because of the lower placement of the wobble drive unit and wobble drive shaft, due to the connection to the conditioning roll rather than connection to a shaft running above the header discharge opening, the wobble drive components are at a less steep angular relationship to the cutting means 25, thereby shortening the necessary length of the drive shaft and creating a more compact and economical drive unit.

Figure 5:
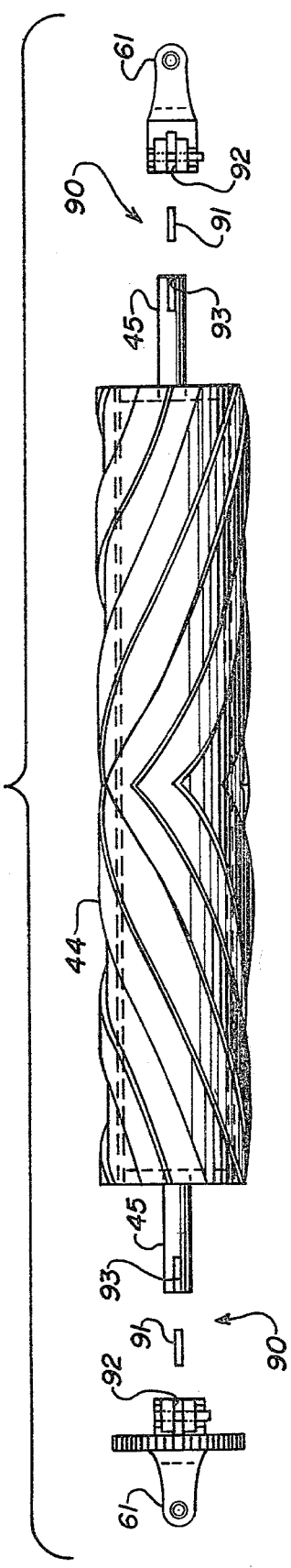
FIG. 5 is an exploded diagrammatical view of the upper conditioning roll showing the use of keyways to maintain proper timing between the opposing sickle bars.

To keep header vibrations to a minimum, the left and right sickle bars 26, 27 should be counter-reciprocating. More particularly, each respective sickle bar should be moving toward the respective outboard side of the windrower 10 at the same time; conversely, the movement inboard, toward each other, should also be simultaneous. The use of a positive drive system as previously described allows for the construction of keyways 90 on the shaft members 65, 67 or 69 to interfit correspondingly constructed universal joints 61, or 62, as is exemplified in FIG. 5. The keyways 90 are generally comprised of a key 91 which fits within a groove 93 on the end of any shaft member 65, 67 or 69 and a corresponding groove 92 in the universal joint 61 or 62. Keyways 90 provide a simple means for maintaining proper timing of the sickle bar motions.

Other advantages to a twin sickle drive system incorporating the principles of the instant invention include the use of a minimum number of parts, ease of service and a reduction in cost. Such advantages can be realized by reason that a separate drive shaft, supports and bearings are not necessary to span the length of the conditioning roll. Also, using the roll as part of the drive system allows the drive system to go through the crop discharge area without interfering with the flow of the crop material. Alternatively, whenever physical placement will permit, the universal shaft assembly 60 could be connected to the lower conditioning roll 42, thereby resulting in an even less steep angle to the horizontal plane. One particular advantage to driving through the lower roll 42 rather than the upper roll 44 is that the lower roll 42 is fixed against any vertical movement. Also, since there is no relative vertical movement, the universal joints in the rotary input shafts, interconnecting the crop treating means and the respective wobble hub, could possibly be eliminated.

Moreover, by reason that the axes of the conditioning rolls are rotating at a relatively high rate of speed, as compared to the axis of the reel, for example, the sickle bars can be driven therefrom without the need for expensive gearboxes and the like.

Figure 6:
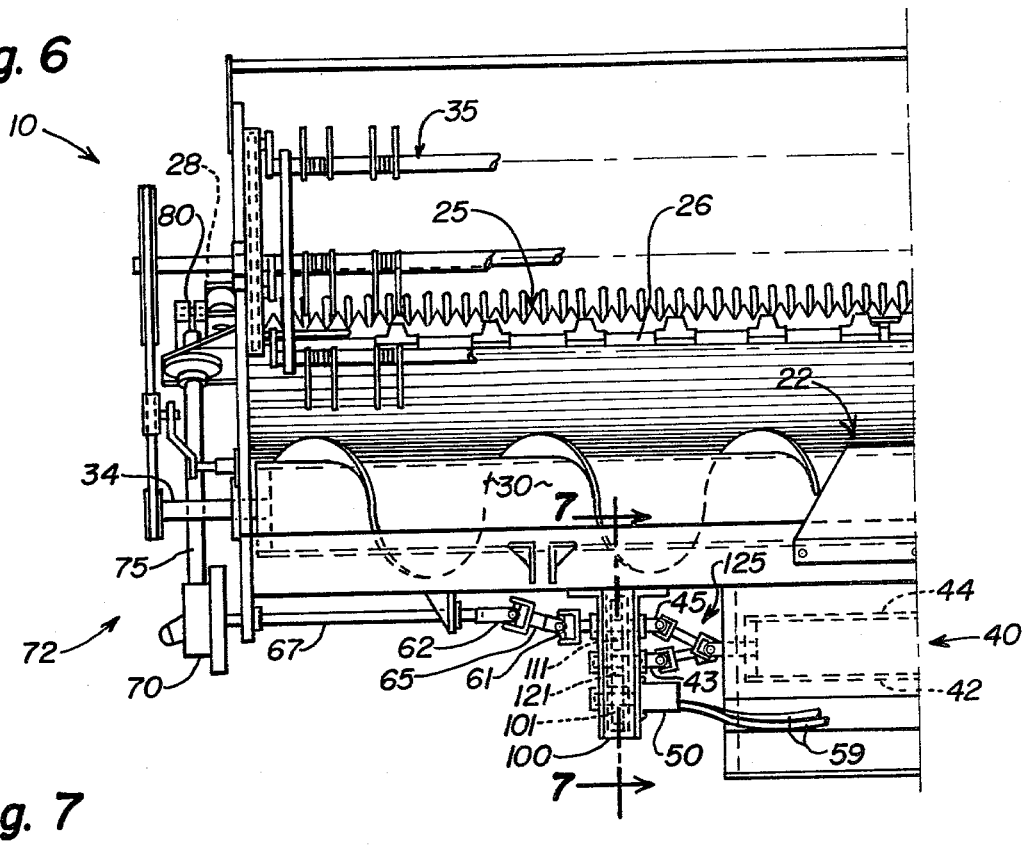
FIG. 6 is an enlarged partial top plan view showing the hydrostatic motor as the primary power source utilizing a gearbox to provide rotational power to the crop conditioning unit.
Figure 7:
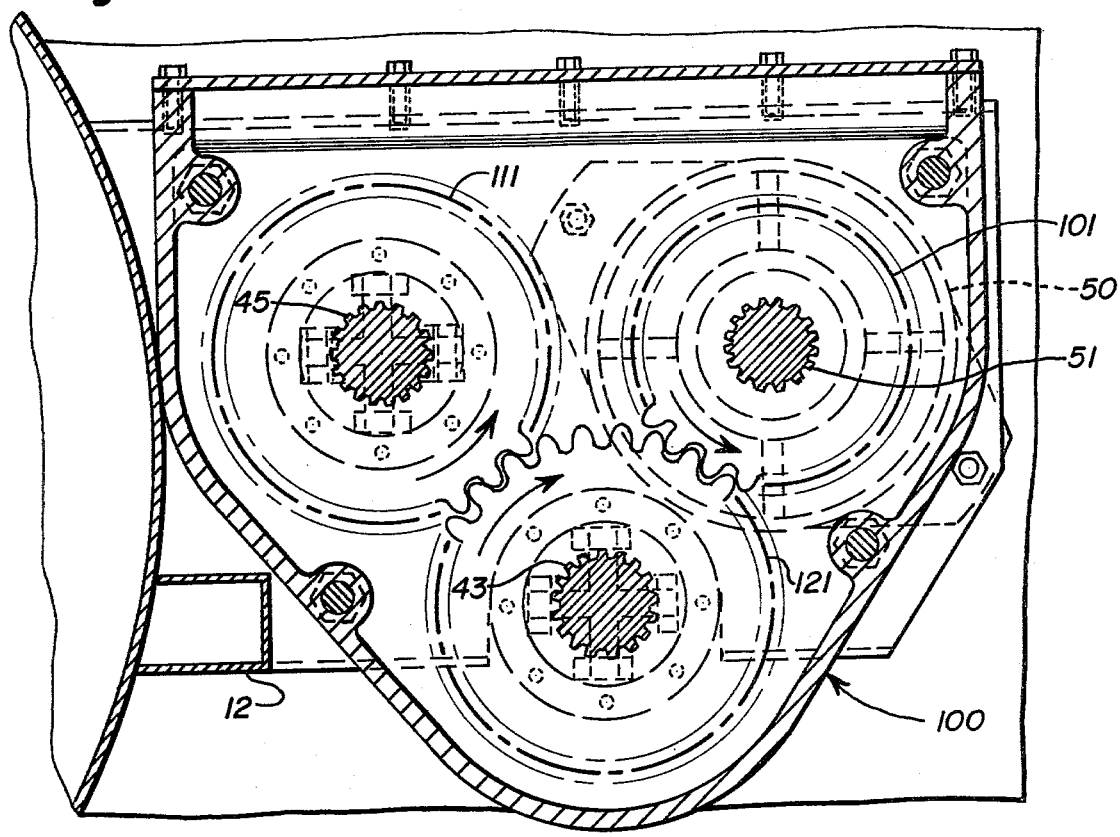
FIG. 7 is an enlarged cross sectional view of the gearbox taken along line 7—7 of FIG. 6.

Referring now to FIGS. 6 and 7, an alternative embodiment of this novel drive system can be seen. The chain drive system described with respect to FIGS. 3 and 4, in particular, may be replaced by the gear drive system described below. The hydrostatic motor 50 provides rotational movement of the gears 101, 111 and 121 within the gearbox 100. Gear 101 is connected to the shaft 51 of the hydrostatic motor 50, while gears 111 and 121 are connected to the upper conditioning roll shaft 45 and the lower conditioning roll shaft 43, respectively. As can be seen in FIG. 7, gears 101, 111 and 121 are arranged such that the upper conditioning roll 44 and the lower conditioning roll 42 rotate in opposite directions, the lower roll turning clockwise and the upper roll turning counterclockwise, as best seen in FIG. 7.

As shown in FIG. 6, both the upper and lower conditioning roll shafts 45, 43 respectively, include universal joint assemblies 125, which extend between the gearbox 100 and the individual conditioning rolls 44, 42 respectively, to assure proper operational function should there be some relative movement between the gearbox 100 and the crop treating means 40 during operation of the windrower 10. It should be understood by one skilled in the art that this drive system can be utilized on any harvesting machine which includes both a twin sickle cutting means and a rotary crop treating (conditioning) means. It should be further realized by one skilled in the art that that invention is not limited to only rotary crop conditioning means which include upper and lower conditioning rolls.

It will be understood that various changes in the details, materials, steps and arrangements of parts which have been described and illustrated in order to explain the nature of the invention, will occur to and may be made by those skilled in the art upon a reading of the disclosure within the principles and scope of the invention.

Having thus described the invention, what is claimed is:

1. In a crop harvesting machine having a mobile frame adapted for movement across a field; a crop harvesting header having a forward end transverse to the line of travel of said crop harvesting machine, a right side, a left side laterally spaced from said right side, and a rear discharge area; a crop cutting means transversely disposed at said forward end of said header for engaging and severing the crop to be harvested, said crop cutting means including right and left sickle bars, each said sickle bar having an inboard end and a remote outboard end, each said sickle bar being positioned such that the respective said outboard ends are adjacent the respective sides of said header; a sickle bar drive means for providing reciprocating motion to said crop cutting means, said sickle bar drive means being operably connected to the outboard end of each respective said sickle bar; a rotatable crop treating means for conditioning said severed crop, said crop treating means being located rearward of said rear discharge area substantially parallel to said crop cutting means; and a primary drive means for providing operational movement of said crop treating means and said sickle bar drive means, the improvement wherein said sickle bar drive means comprises:

right and left wobble drive units for transforming rotary motion into reciprocating linear motion for the respective said sickle bars, each said wobble drive unit being connected to the outboard end of said sickle bars; and right and left rotary input shafts interconnecting said crop treating means and the respective said wobble drive units, each respective said rotary input shaft being rotatable with said crop treating means for transferring rotational motion to the respective said wobble drive unit.

2. The crop harvesting machine of claim 1 wherein said crop treating means includes upper and lower substantially cylindrical conditioning rolls rotatably supported by said mobile frame, said upper conditioning roll being positioned above said lower conditioning roll, said upper roll being substantially parallel to said lower roll.

3. The crop harvesting machine of claim 2, wherein said right and left rotary input shafts are connected to the respective ends of said lower conditioning roll.

4. The crop harvesting machine of claim 2, wherein said right and left rotary input shafts are connected to the respective ends of said upper conditioning roll.

5. The crop harvesting machine of claim 3 or claim 4 wherein each respective said rotary input shaft includes first and second universal joints and a shaft member extending therebetween, said shaft member including an anti-slip means for interacting with said universal joints to maintain the positional relationship of said shaft member relative to said universal joints such that the reciprocating linear motion of one said sickle bar relative to the other said sickle bar can be properly timed to reduce vibration therefrom.

6. The crop harvesting machine of claim 5 wherein said anti-slip means includes a key member, a first groove on said shaft member and a second groove in said universal joint, said key member extending between and interconnecting said first and second grooves.

7. The crop harvesting machine of claim 5 wherein said header further includes a reel rotatably journaled between said right and left sides above said crop cutting means, said primary drive means providing rotational movement thereto.

8. The crop harvesting machine of claim 7 wherein said header further includes a consolidating means between said crop cutting means and said rear discharge area, said rear discharge area being laterally smaller than said crop cutting means, said primary drive means providing operational power to said consolidating means.

9. The crop harvesting machine of claim 8 wherein said rear discharge area and said crop treating means are centered about the line of travel of said crop harvesting machine.

10. The crop harvesting machine of claim 9 wherein said upper and lower conditioning rolls are rotatably supported in said crop harvesting header.

11. The crop harvesting machine comprising:

a mobile frame adapted for movement across a field;

a crop harvesting header attached to said frame forwardly thereof and transverse to the line of travel, said header having a forward end, first and second laterally spaced sides substantially perpendicular to said forward end, and a rear discharge area;

a crop cutting means transversely disposed at said forward end of said header for engaging and severing the crop to be harvested, the crop cutting means having first and second sickle bars, each said sickle bar having an inboard end and a remote outboard end, each said sickle bar being positioned such that the respective said outboard ends are adjacent the respective said sides of said header;

a rotary crop treating means for conditioning said severed crop, the crop treating means being located rearward and substantially coextensive with said rear discharge area, said crop treating means further being substantially parallel to said crop cutting means;

a sickle bar drive means for providing reciprocating motion to said crop cutting means, said sickle bar drive means having first and second wobble drive units positioned laterally from said crop treating means and contiguous to the respective said sides of said header for transforming rotary motion into reciprocating linear motion, said wobble drive units being operably connected to the respective outboard ends of said first and second sickle bars, and left and right rotary input shafts interconnecting the respective said wobble drive units and the crop treating means to transfer rotational motion to the respective said wobble drive unit; and a primary drive means for providing movement to said crop treating means.

12. The crop harvesting machine of claim 11 wherein said header further includes a reel rotatably journaled between said right and left sides above said crop cutting means, said primary drive means providing rotational movement therefore.

13. The crop harvesting machine of claim 12 wherein said crop treating means includes a lower substantially cylindrical conditioning roll rotatably supported by said mobile frame and an upper generally cylindrical conditioning roll rotatably supported by said frame above and forward of said lower conditioning roll, said upper roll being substantially parallel to said lower roll.

14. The crop harvesting machine of claim 13 wherein said first and second rotary input shafts are connected to the respective ends of said lower conditioning roll.

15. The crop harvesting machine of claim 13 wherein said first and second rotary input shafts are connected to the respective ends of said upper conditioning roll.

16. The crop harvesting machine of claim 14 or claim 15 wherein each respective said rotary input shaft includes first and second universal joints and a shaft member extending therebetween, the shaft member including an anti-slip means for interacting with said universal joints to maintain the positional relationship of said shaft member relative to said universal joints such that the reciprocating linear motion of one said sickle bar relative to the other said sickle bar is properly timed to reduce vibrations therefrom.

* * * * *